US010628393B2

(12) United States Patent
Giuliani et al.

(10) Patent No.: US 10,628,393 B2
(45) Date of Patent: *Apr. 21, 2020

(54) GENERATING DATA TABLES

(71) Applicant: International Business Machines Corporation, Armonk, NY (US)

(72) Inventors: Timotheus D. B. Giuliani, Sindelfingen (DE); Tunca Karabel, Boeblingen (DE); Johannes S. Kern, Boeblingen (DE); Philipp Klippel, Hausham (DE); Klaus J. Liegert, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 14/748,385

(22) Filed: Jun. 24, 2015

(65) Prior Publication Data

US 2016/0378675 A1 Dec. 29, 2016

(51) Int. Cl.
*G06F 16/21* (2019.01)
*G06F 11/36* (2006.01)

(52) U.S. Cl.
CPC .......... *G06F 16/21* (2019.01); *G06F 11/3684* (2013.01); *G06F 11/3688* (2013.01)

(58) Field of Classification Search
USPC ....................................................... 707/803
See application file for complete search history.

(56) References Cited

U.S. PATENT DOCUMENTS

| 6,330,653 | B1* | 12/2001 | Murray ................. G06F 3/0605 711/173 |
| 6,763,352 | B2 | 7/2004 | Cochrane et al. |
| 6,898,588 | B2* | 5/2005 | Kosciuszko ............ G06F 16/22 707/715 |
| 7,206,805 | B1* | 4/2007 | McLaughlin, Jr. ..... G06F 9/466 707/999.01 |
| 7,974,942 | B2 | 7/2011 | Pomroy et al. |
| 8,825,601 | B2 | 9/2014 | Huynh Huu et al. |
| 9,141,664 | B2 | 9/2015 | Mitchell et al. |
| 2007/0203925 | A1 | 8/2007 | Sandler et al. |
| 2008/0114744 | A1* | 5/2008 | Colby ............... G06F 17/30448 |
| 2008/0162415 | A1* | 7/2008 | Kaiser ................. G06F 17/3056 |
| 2009/0248616 | A1* | 10/2009 | Molini ............. G06F 17/30336 |

(Continued)

OTHER PUBLICATIONS

Giuliani et al., "Generating Data Tables", U.S. Appl. No. 15/172,322, filed Jun. 3, 2016, 28 pages.

(Continued)

*Primary Examiner* — Tamara T Kyle
*Assistant Examiner* — Raheem Hoffler
(74) *Attorney, Agent, or Firm* — Edward J. Wixted, III

(57) ABSTRACT

The method includes identifying a first data table that includes a set of rows and a structure. The method further includes creating a second data table and a third data table having a matching structure as the first table. The method further includes distributing the set of rows of the first data table, wherein the set of rows is distributed between one or more of the second data table and the third data table based upon preset parameters. The method further includes, generating one or more operations for the set of rows. The method further includes executing one of the one or more generated operations on the second data table and the third data table.

12 Claims, 4 Drawing Sheets

(56) References Cited

U.S. PATENT DOCUMENTS

| | | | |
|---|---|---|---|
| 2009/0259618 A1* | 10/2009 | Shi | G06F 16/2282 |
| 2010/0114841 A1 | 5/2010 | Holenstein | |
| 2010/0235606 A1* | 9/2010 | Oreland | G06F 17/3033 |
| | | | 711/173 |
| 2011/0125704 A1* | 5/2011 | Mordvinova | G06F 16/27 |
| | | | 707/600 |
| 2011/0289398 A1* | 11/2011 | Chin | G06F 17/245 |
| | | | 715/227 |
| 2012/0041988 A1* | 2/2012 | Driesen | G06F 17/30297 |
| | | | 707/803 |
| 2012/0310991 A1* | 12/2012 | Frantz | G06F 16/284 |
| | | | 707/799 |
| 2013/0083030 A1* | 4/2013 | Fukuda | G06F 8/34 |
| | | | 345/440 |
| 2013/0159327 A1* | 6/2013 | Kim | G06Q 50/265 |
| | | | 707/755 |
| 2014/0172794 A1 | 6/2014 | Bartholoma et al. | |
| 2015/0248403 A1* | 9/2015 | Pazdziora | G06F 17/303 |
| | | | 707/809 |
| 2016/0098443 A1 | 4/2016 | Specht | |

OTHER PUBLICATIONS

Appendix P, List of IBM Patents or Patent Applications Treated As Related, 2 pages, dated Jun. 13, 2016.

Belknap, et al., "Oracle Real Application Testing", DBTest '08, 6 pages, Jun. 13, 2008, Copyright 2008 ACM.

Binnig, et al., "Multi-RQP—Generating Test Databases for the Functional Testing of OLTP Applications", DBTest '08, 6 pages, Jun. 13, 2008, Copyright 2008 ACM.

Haller, "The Test Data Challenge for Database-Driven Applications", DBTest '10, 6 pages, Jun. 7, 2010, Copyright 2010 ACM.

Rabl, et al., "Rapid Development of Data Generators Using Meta Generators in PDGF", DBTest '13, 6 pages, Jun. 24, 2013, Copyright ACM.

Shen, et al., "Reversing Statistics for Scalable Test Databases Generation", DBTest '13, 6 pages, Jun. 24, 2013, Copyright ACM.

"DTM Data Generator—Realistic data for database testing purposes", Copyright 2004-2015 DTM, 2 pages, downloaded Feb. 18, 2015, <http://www.sqledit.com/dg/test_database.html?AdWordsDG>.

"Datanamic Data Generator MultiDB—Automated Test Data Generation", Copyright Datanamic Solutions BV, 3 pages, downloaded Feb. 18, 2015, <http://www.datanamic.com/datagenerator/index.html?gclid=COTasKqA4LsCFcJd3godhVgA5Q>.

"SQL Data Generator—Generate realistic test data fast", pp. 1-8, Copyright 1999-2015 Red Gate Software, Inc., downloaded Feb. 18, 2015, <http://www.red-gate.com/products/sql-development/sql-data-generator/?utm_source=google&utm_medium=cpc&utm_content=unmet_need&utm_campaign=sqldatagenerator&gclid=CPuxo_qA4LsCFcJd3godhVgA5Q>.

"Synthetic Test Data Generation", pp. 1-7, downloaded Feb. 18, 2015, Copyright 2014 Grid-Tools, <http://www.grid-tools.com/test_data_management_products/test_data_management/synthetic_test_data_creation/?gclid=CPH2nMeB4LsCFcNF3godWSUAIQ>.

* cited by examiner

GENERATING DATA TABLES

BACKGROUND OF THE INVENTION

The present invention relates generally to data tables, and more particularly to generating data delta sequences without modifying data.

Test data generation is the process of creating a set of data for testing the adequacy of new or revised software applications. During the test data generation data may be the actual data that has been taken from previous operations or artificial data created for the testing. The use of dynamic memory allocation in code may cause the software to become unpredictable, making anticipating the paths that a program could take difficult thereby making it difficult for the test data generators to generate exhaustive test data. However, in the past decade significant progress has been made in tackling this problem better by the use of genetic algorithms and other analysis algorithms. Moreover, software testing is an important part of the software development life cycle and is labor intensive. Software testing accounts for nearly a third of the cost of system development expenditures.

SUMMARY

Embodiments of the present invention disclose a method, computer program product, and system for generating data tables. In one embodiment, in accordance with the present invention, the computer-implemented method includes identifying, by one or more computer processors, a first data table that includes a set of rows and a structure. The method further includes creating, by one or more computer processors, a second data table and a third data table having a matching structure as the first table. The method further includes distributing, by one or more computer processors, the set of rows of the first data table, wherein the set of rows is distributed between one or more of the second data table and the third data table based upon preset parameters. The method further includes, generating, by one or more computer processors, one or more operations for the set of rows. The method further includes executing, by one or more computer processors, one of the one or more generated operations on the second data table and the third data table.

DETAILED DESCRIPTION

Embodiments of the present invention recognize that it may be desirable for a data generator to have the following functions: deterministic behavior based on predefined generation in which repeated runs yield the same results; fully automated and configurable for specific frequency, distribution (e.g., uniform distribution via a statistical distribution function), time, ratio of number of insert, delete, and update operations; usability for all workloads without workload schema modification (e.g., agnostic with respect to workloads and database schemas); and usability for unmodified real world (e.g., customer supplied) data without modification that may result in differences in data characteristics, such as correlations, skew, value distribution, etc.

Implementation of embodiments of the invention may take a variety of forms, and exemplary implementation details are discussed subsequently with reference to the Figures.

Figure 1:
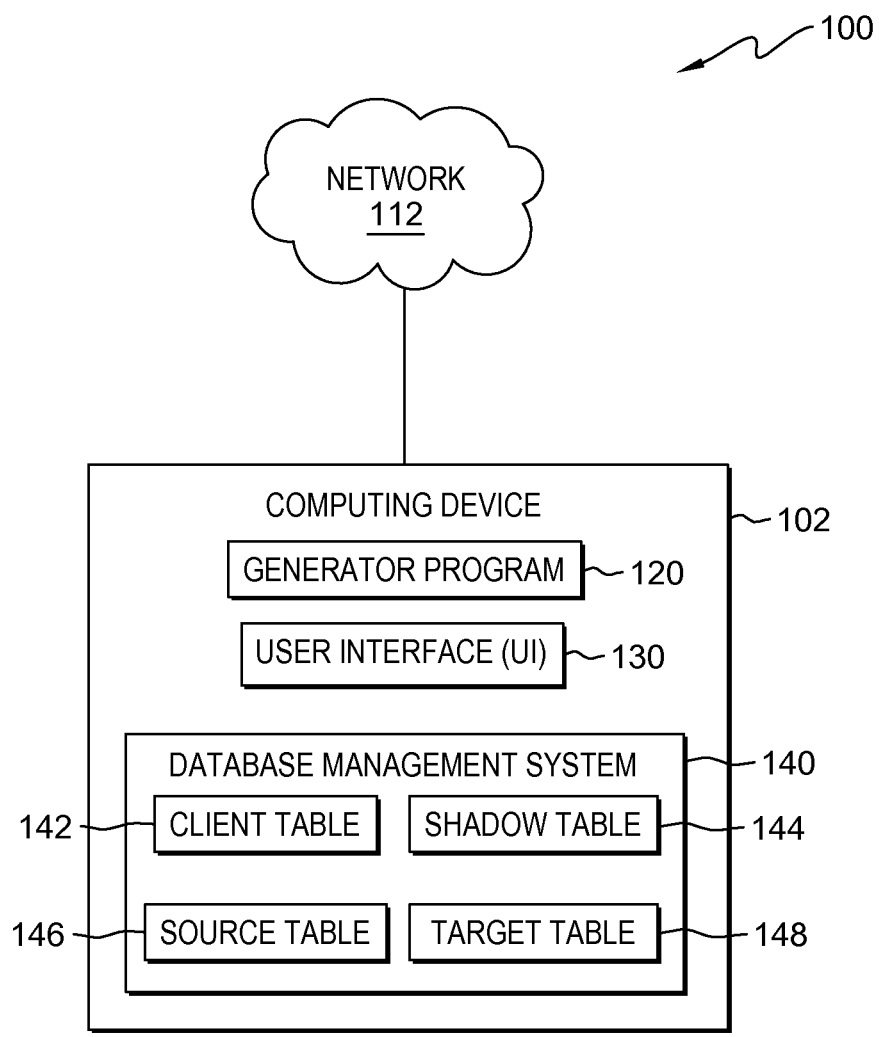
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 102 connected to network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, computing device 102 is one or more of a management server, a web server, or any other electronic device or computing system capable of receiving, analyzing, and sending data. In this embodiment, computing device 102 receives (e.g., receives a client table as well as the definition and input for the client table) and tests data without modifying the data or schema. In other embodiments, computing device 102 represents a server computing system utilizing multiple computers as a server system, such as in a cloud computing environment. In another embodiment, computing device 102 represents a laptop computer, a tablet computer, a netbook computer, a personal computer (PC), a desktop computer, a personal digital assistant (PDA), a smart phone, or any programmable electronic device capable of communicating network 112. In another embodiment, computing device 102 represents a computing system utilizing clustered computers and components to act as a single pool of seamless resources. Computing device 102 may include components as depicted and described in further detail with respect to FIG. 4, in accordance with embodiments of the present invention. Computing device 102 includes generator program 120, user interface (UI) 130, and database management system 140.

In depicted distributed data processing environment 100, generator program 120 resides on computing device 102 and receives and utilizes data for tests without modifying the data or schema. In various embodiments, generator program 120 receives information from a computing device (not depicted) containing data to be tested via network 112. In some embodiments, generator program 120 may receive the data directly (e.g., a removable disk) and not via network 112. In some embodiments, generator program 120 creates a table with the same schema as the original table, but does not include the original data. In various embodiments, generator program 120 receives data, creates a copy of the data with the same schema and tests the data in a closed system (e.g., the data is not modified). In an example, a customer may submit data (e.g., client table 142) to be tested by generator program 120. Generator program 120 creates a copy of the data identical to the original customer supplied data (e.g., shadow table 144). Generator program 120 creates two additional tables or databases (e.g., source table 146 and target table 148), which include the same schema as the customer table. Generator program 120 populates the additional tables or databases (e.g., source table 146 and target table 148) based upon user defined parameters. Generator program 120 inserts, deletes and updates the data back and forth between the additional tables in a closed system as not to change or lose any data. In some embodiments, generator program 120 may receive information (e.g., database or table schema, proportions of operations to perform on the received data, queries to determine the order of data selected, etc.) from a user of generator program 120 via a UI (e.g., UI 130).

In the depicted embodiment, database management system (DBMS) 140 resides on computing device 102. In another embodiment, DBMS 140 may reside elsewhere in distributed data processing environment 100, such as within computing device 102 or independently as a standalone database management system that is capable of communicating with computing device 102 via network 112. A database management system (DBMS) is a computer program designed to manage a database, a large set of structured data, and run operations on the data. DBMS 140 stores and manages information, such as data tables, schema, client information (e.g. parameters, workloads, insert/delete/update ratios, etc.) databases, etc. In various other embodiments, DBMS 140 may contain information to determine the order in which records are applied, seed values for random number generators, the number of operations to perform, operations per minute to perform, the time to wait until generator program 120 applies the operation to the database, etc.

In depicted distributed data processing environment 100, client table 142 resides in DBMS 140 and is a database, data table, or some other representation of data known in the art. In another embodiment, client table 142 may reside elsewhere in distributed data processing environment 100, such as within computing device 102 or independently as a standalone database that is capable of communicating with computing device 102 via network 112. A database is an organized collection of data. Client table 142 is implemented with any type of storage device capable of storing data that is accessed and utilized by computing device 102, such as a database server, a hard disk drive, or a flash memory. In other embodiments, client table 142, as well as information stored within client table 142, may represent multiple storage devices within computing device 102, within other computing device within environment 100 (not depicted), or as a standalone database capable of communicating with computing device 102 via network 112. In various embodiments, client table 142 contains data created on another computing device (not depicted). In an embodiment, generator program 120 can receive client table 142 from a client of generator program 120 located on another computing device (not depicted) via network 112. In some embodiments, generator program 120 may store client table 142 in DBMS 140. In other embodiments, generator program 120 may create a copy of client table 142, which is located on another computing device (not depicted) and store the copy (e.g., shadow table 144) in DBMS 140. In some examples, generator program 120 may not create a shadow table, but rather work directly from the client table to the target table.

In depicted distributed data processing environment 100, shadow table 144 resides on DBMS 140 and is a copy of client table 142. In another embodiment, shadow table 144 may reside elsewhere in distributed data processing environment 100, such as within computing device 102 or independently as a standalone database that is capable of communicating with computing device 102 via network 112. A database is an organized collection of data. Shadow table 144 is implemented with any type of storage device capable of storing data that is accessed and utilized by computing device 102, such as a database server, a hard disk drive, or a flash memory. In other embodiments, shadow table 144, as well as information stored within shadow table 144 may represent multiple storage devices within computing device 102, within other computing device within environment 100 (not depicted), or as a standalone database capable of communicating with computing device 102 via network 112. In various embodiments, shadow table 144 is used by generator program 120 to populate source table 146 and target table 148. In some embodiments, shadow table 144 is created by generator program 120 as an identical copy of client table 142 as to not manipulate client table 142. In some embodiments, a user of computing device 102 may create a shadow table. In an embodiment, shadow table 144 has the same schema and data as client table 142. In some embodiments, generator program 120 utilizes data from shadow table 144 to populate source table 146 and target table 148 based upon preset sequence of insert, delete, and update operations. In some embodiments, shadow table 144 may not be created or utilized by generator program 120 as generator program 120 may transfer data directly from a client table to a target or source table.

In depicted distributed data processing environment 100, source table 146 resides on DBMS 140 and contains a subset of data from shadow table 144. In another embodiment, source table 146 may reside elsewhere in distributed data processing environment 100, such as within computing device 102 or independently as a standalone database that is capable of communicating with computing device 102 via network 112. A database is an organized collection of data. Source table 146 is implemented with any type of storage device capable of storing data that is accessed and utilized by computing device 102, such as a database server, a hard disk drive, or a flash memory. In other embodiments, source table 146, as well as information stored within source table 146 may represent multiple storage devices within computing device 102, within other computing device within environment 100 (not depicted), or as a standalone database capable of communicating with computing device 102 via network 112. In other embodiments, source table 146 may contain all data from shadow table 144 or client table 142. In various embodiments, source table 146 contains a subset of data from shadow table 144 that is inserted, deleted, or updated in conjunction with deleted, inserted, or updated data on target table 148 in a closed system. In an example of a closed system, generator program 120 divides unmodified rows of client table 142 into source table 146 and target table 148 so that the union of source table 146 and target table 148 is equal to client table 142. In another embodiment, source table 146 may be a combinations of multiple client tables, shadow tables, and/or target tables.

In depicted distributed data processing environment 100, target table 148 resides on DBMS 140 and contains a subset of data from shadow table 144. In another embodiment, target table 148 may reside elsewhere in distributed data processing environment 100, such as within computing device 102 or independently as a standalone database that is capable of communicating with computing device 102 via network 112. A database is an organized collection of data. Target table 148 is implemented with any type of storage device capable of storing data that is accessed and utilized by computing device 102, such as a database server, a hard disk drive, or a flash memory. In other embodiments, target table 148, as well as information stored within target table 148 may represent multiple storage devices within computing device 102, within other computing device within environment 100 (not depicted), or as a standalone database capable of communicating with computing device 102 via network 112. In other embodiments, target table 148 may contain all data from shadow table 144 or client table 142. In various embodiments, target table 148 contains a subset of data from shadow table 144 that is inserted, deleted, or updated in conjunction with deleted, inserted, or updated data on source table 146 in a closed system. In an example of a closed system, generator program 120 divides unmodified rows of client table 142 into source table 146 and target table 148 so that the union of source table 146 and target table 148 is equal to client table 142. In another embodiment, target table 148 may be a combinations of multiple client tables, shadow tables, and/or source tables. In multiple embodiments, target table 148 is a table which generator program runs test on data from source table 146.

In depicted distributed data processing environment 100, user interface (UI) 130 resides on computing device 102. In other embodiments, UI 130 may reside on another computing device (not depicted) capable of communicating with computing device 102 via network 112. UI 130 is a computer program that provides an interface between a user and generator program 120. A user interface refers to the information, such as graphic, text, and sound, a program presents to a user, and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

Figure 2:
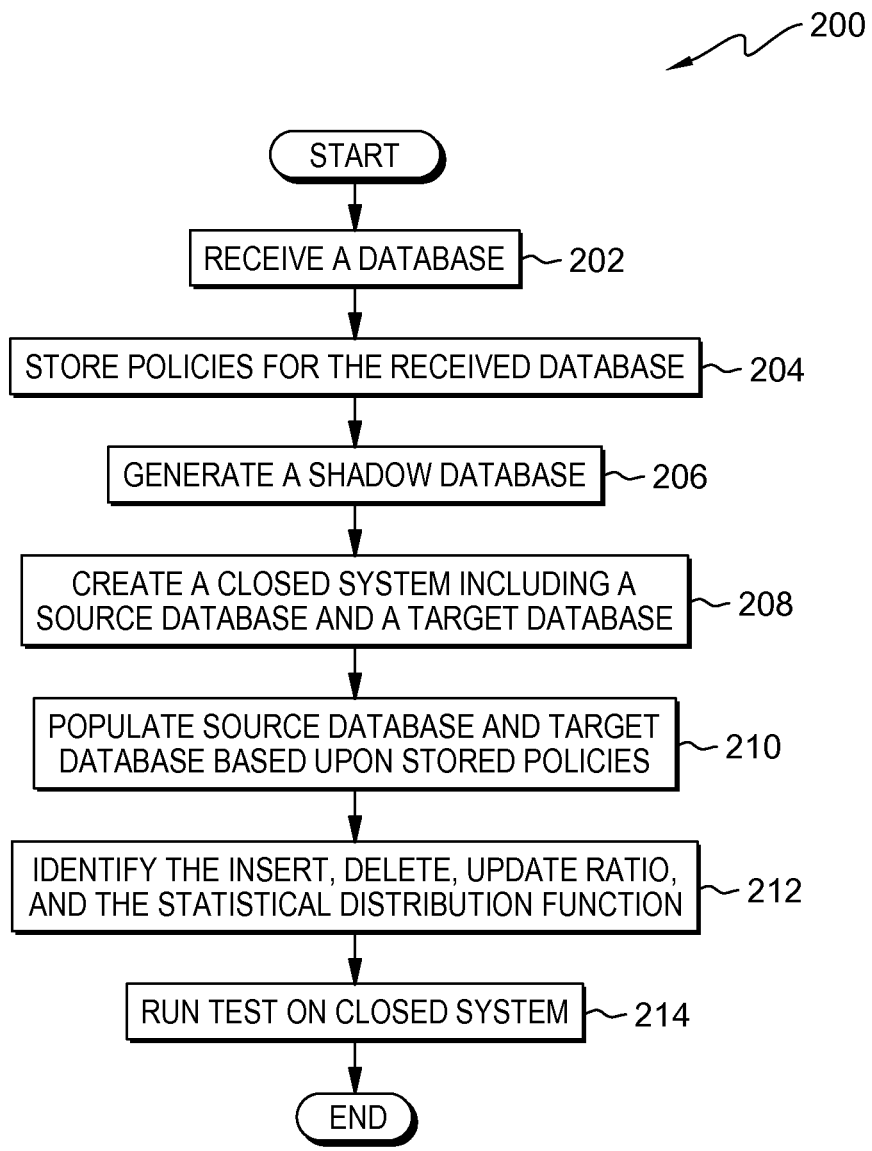
FIG. 2 is a flowchart depicting operational steps of a program for generating data within the distributed data processing environment of FIG. 1, in accordance with an embodiment of the present invention.

FIG. 2 is a flowchart depicting operational steps of program 200, which is a function of generator program 120, in accordance with an embodiment of the present invention. Program 200 operates on computing device 102 and generates data. In various embodiments, generator program may initiate in response to receiving new data (e.g., client table 142). In another embodiment, program 200 may initiate the operational steps depicted in FIG. 2 when a user starts the program via UI 130. In one embodiment, program 200 may initiate at a preset time.

Program 200 receives a database (step 202). In various embodiments, program 200 receives or identifies a database to test. In one example, program 200 identifies a database, such as source table 146, which has been stored in DBMS 140. In an example, a user may indicate a specific database for program 200 to identify or receive via UI 130. In some embodiments, program 200 receives a database from another computing device (not depicted) via network 112. In an example, program 200 receives client table 142 from a computing device (not depicted) via network 112.

Program 200 stores policies for the received database (step 204). In various embodiments, program 200 stores policies for the received database (e.g., client table 142) in a database (e.g., DBMS 140). In an example, the received database may contain metadata that indicates a statistical distribution function. The statistical distribution function may also be stored separately in a database, such as DBMS 140. In some examples, a user of program 200 may create and store a statistical distribution function, as well as other policies associated with the received database, via UI 130. Program 200 utilizes a statistical distribution function to determine the random sequence of records on source and target tables that are candidates for insert, update, and delete operations. In one embodiment, program 200 stores the intended insert, delete, update ratio for the received database (e.g., client table 142) in a database (e.g., DBMS 140). In some examples, the insert, delete, update ratio may be stored as metadata attached to client table 142, or stored separately in DBMS 140.

In an embodiment, a random number generator generates random numbers that are distributed by a given statistical distribution function. The random number generator, the statistical distribution function, as well as the seed value may be stored in a database (e.g., DBMS 140). By storing the seed number, program 200 can generate the same random numbers while running the test in step 214. In an example, each time random numbers are generated, the same numbers in the same sequence are generated because the same seed value is used. In various embodiments, program 200 stores multiple items related to a received database (e.g., client table 142), such as the total number of operations to perform, the number of operations to perform per minute (default can be set to perform operations as fast as possible), the time to wait before a modified row in a table (e.g., source table 146) becomes available again (the argument is in the form integer greater than zero followed by seconds, minutes, hours), and moving all rows from one table (e.g., source table 146) to another table (e.g., target table 148).

Program 200 generates a shadow database (step 206). In some embodiments, program 200 generates a shadow database (e.g., shadow table 144) that is an exact copy of the received database (e.g., client table 142). In some examples, program 200 may not store client table 142, and may create a copy (e.g., shadow table 144) of client table 142. In some examples, program 200 may not receive a database in step 202, but rather copy a database (e.g., client table 142) which is located on another computing device (not depicted). In various embodiments, program 200 copies the received database (e.g., client table 142) as not to modify the received database, and all operations are performed based on the copy of the received database (e.g., shadow table 144). In an embodiment, program 200 copies and tags metadata from the received database (e.g., client table 142) to the newly created database (e.g., shadow table 144). In an example, any data which is stored in step 204 that correlates to client table 142 is also created for shadow table 144.

Program 200 creates a closed system including a source database and a target database (step 208). In various embodiments, program 200 creates two databases that employ the same schema as the received database (e.g., client table 142) and the copy of the received database (e.g., shadow table 144). The same schema is also known as a matching schema. In some embodiments, program 200 creates two databases with a matching structure to the first database. In some embodiments, program 200 utilizes a client database (e.g., client table 142 instead of a shadow database (e.g., shadow table 144). In an example, shadow table 144 is spreadsheet containing data with specific parameters. Program 200 creates two tables that are linked in a closed system (e.g., source table 146 and target table 148). In the closed system no data can be created or destroyed, just transferred from one table to the other table.

Program 200 populates the source database and the target database based upon stored policies (step 210). In various embodiments, program 200 populates the sources database (e.g., source table 146) and the target database (e.g., target table 148) in the closed system with data from the database copy (e.g., shadow table 144) of the received database (e.g., client table 142). In an example, program 200 identifies data stored with shadow table 144 that indicates which rows of a spreadsheet table (e.g., shadow table 144) to populate into source table 146 and which rows of a spreadsheet table (e.g., shadow table 144) to populate into target table 148. In some examples, program 200 may populate all of the data from shadow table 144 into only one of the closed systems databases (e.g., source table 146 or target table 148).

Program 200 identifies the insert, delete, update ratio and the statistical distribution function (step 212). In some embodiments, program 200 identifies the operations to perform for the databases in the closed system (e.g., source table 146 and target table 148). In some embodiments, sub programs may perform operations of program 200. In an example, program 200 may utilize sub programs to determine the order a row is chosen from a database (e.g., source table 146 or target table 148). The sub programs may determine the order based upon predefined policies, such as the statistical distribution function, or real world customer scenarios. In an example of real world customer scenarios, program 200 can replay customer workloads on synthetic data. In another example, program 200 can replay customer workloads on the original customer data. In some examples, the insert, delete, update ratio can be utilized on different data sets in a deterministic way if program 200 can identify which operation occurred and how many rows were affected.

Program 200 runs a test on the closed system (step 214). In some embodiments, program 200 runs a test on the source database (e.g., source table 146) and target databases (e.g., target table 148) within the closed system based upon the preset rules, such as the insert, delete, update ratio, statistical distribution function, the number of operations to run, the operations to perform per minute, etc. In an example, program 200 performs operations on the data, such as insert a row from source table 146 into target table 148 and deleting the same row from source table 146. In other words, the insert operation is a transaction including an insert into target table 148 and a delete from source table 146. In an example, a delete operation results in a delete from target table 148 and insert the deleted record into source table 146. In multiple embodiments, program 200 runs a test on the closed system and obtains the same results as previously run tests, provided that the same preset rules are used. In some embodiments, program 200 selects data from one table and inserts the data into another table.

In some embodiments, program 200 executes operations based upon data that is already present in a source database (e.g., source table 146) and a target database (e.g., target table 148). Program 200 does not need to generate new data because program 200 utilizes one closed set of data rows that may be distributed in various ways over the source database and the target database. In various embodiments, program 200 may perform update operations. In an example, program 200 may cache the values of a designated row in source table 146, then update the designated row in the source table 146 with values of a designated row in target table 148, and finally update the designated row in target table 148 with the cached values from the designated row in source table 146. Step 214 is described in further detail in FIG. 3.

Figure 3:
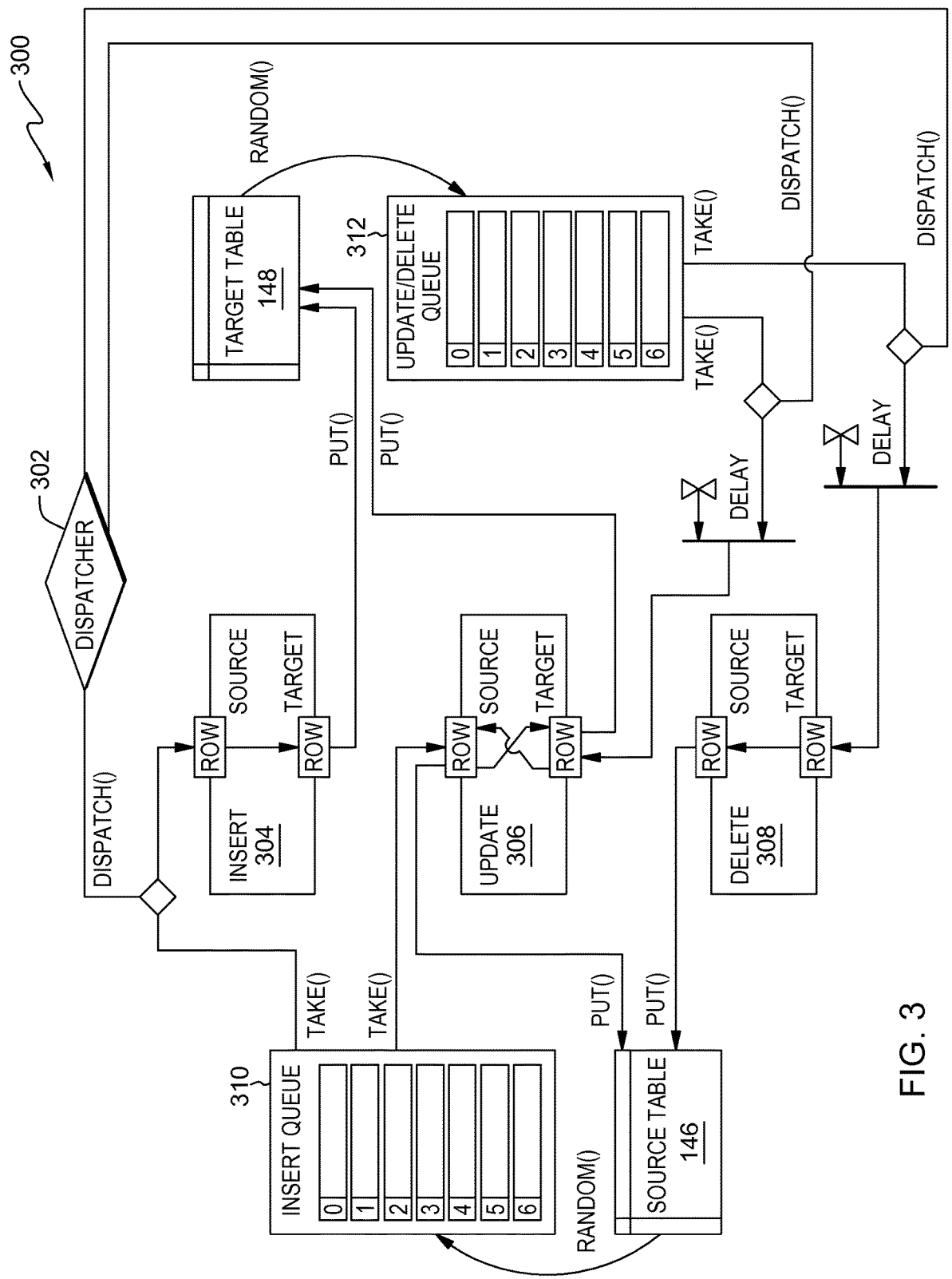
FIG. 3 is a block diagram illustrating one embodiment of possible test scenarios from step 214, in accordance with an embodiment of the present invention.

FIG. 3 is a functional block diagram illustrating a processes occurring in step 214 of FIG. 2, generally designated program 300, in accordance with one embodiment of the present invention. FIG. 3 provides only an illustration of one implementation and does not imply any limitations with regard to step 214 in which different embodiments may be implemented. Many modifications to the depicted process may be made by those skilled in the art without departing from the scope of the invention as recited by the claims.

Dispatcher 302 may be one function of program 300. In some embodiments, dispatcher 302 determines when to insert, delete, or update a row in a source database (e.g., source table 146) and a target database (e.g., target table 148). The determination is made based upon the stored ratio of insert, delete, and update functions to apply to the closed system depicted in FIG. 3. In one example, dispatcher 302 identifies the ratio of insert, delete, and update functions for the closed system as 30%, 40%, and 30% respectively. In this example, dispatcher 302 sends an indication to insert 304 30% of the time, delete 308 40% of the time, and update 306 30% of the time. In an embodiment, the application of the ratio may be in a round robin style. In another embodiments, the application of the ratio may be based on a statistical distribution function. In some embodiments, the ratio of insert, update, and delete functions may be unbalanced. In these embodiments, program 300 may end when one of the functions is complete (e.g., either source table 146 or target table 148 are running empty).

Insert 304 is a function of program 300. In some embodiments, insert 304 receives an indication from dispatcher 302 to insert a row from a source database (e.g., source table 146) into a row of a target database (e.g., target table 148). In one example, insert 304 selects the highest row (e.g., row 0) of the available rows (e.g., rows 0-6) in insert queue 310 to insert into target table 148. In an example, dispatcher 302 determines which commands to send by using a random function utilizing the seed value. By utilizing the same seed value, each time the test is run the same sequence of commands will be generated.

Update 306 is a function of program 300. In some embodiments, update 306 receives an indication from dispatcher 302 to update a row from a source database (e.g., source table 146) with a row of a target database (e.g., target table 148) as well as the opposite. In one example, update 306 swaps a row from source table 146 with a row from target table 148. In an example, update 306 selects the rows to swap from the top of the queue in both insert queue 310 and update/delete queue 312. In some embodiments, the queue may only contain a unique identifier for a specific row (e.g., a primary key).

Delete 308 is a function of program 300. In some embodiments, delete 308 receives an indication from dispatcher 302 to delete a row from a target database (e.g., target table 148) and inserts that row back into the source database (e.g., source table 146). In one example, delete 308 select the highest row (e.g., row 0) of the available rows (e.g., rows 0-6) in update/delete queue 312 to delete from target table 148.

Insert queue 310 and update/delete queue 312 are created from source table 146 and target table 148 respectively. In various embodiments, program 300 may populate insert queue 310 from source table 146 by executing queries with the previous identified statistical function from step 212 of FIG. 2. In an example, the statistical function controls the order of row processing. In some embodiments, a query is used to determine the order in which records are applied (e.g., random( ) arrow from source table 146 to insert queue 310). In various embodiments, program 300 may populate update/delete queue 312 from target table 148 by executing queries with the previous identified statistical function from step 212 of FIG. 2. In an example, the statistical function controls the order of row processing. In some embodiments, a query is used to determine the order in which records are applied (e.g., random( ) arrow from target table 148 to update/delete queue 312).

In various embodiments, insert, update, delete statements to source table 146 or target table 148 may be executed certain delay. In an example, program 300 implements a delay when taking a row from insert queue 310 or update/delete queue 312 to ensure the row remains unmodified for a specific time depending on the use case being tested (e.g., the time required for data replication of either source table 146 or target table 148 to another DBMS). In an embodiment, the delay may be preset by a user via UI 130. In some embodiments, the delay may result in a wait situation of delta processing by program 300.

The order of records in the insert and the update/delete queues is controlled by a statistical distribution function (e.g., uniform random distribution). The queue can be processed using one row after another, without having to load all rows into the memory at once. To avoid an impact on program 300, the statistical sequence function is executed at specific points in time to process delta pools instead of executing single invocations per record. In an example, the queue population is executed at the beginning of the processing and at any time one of the queues is empty.

Figure 4:
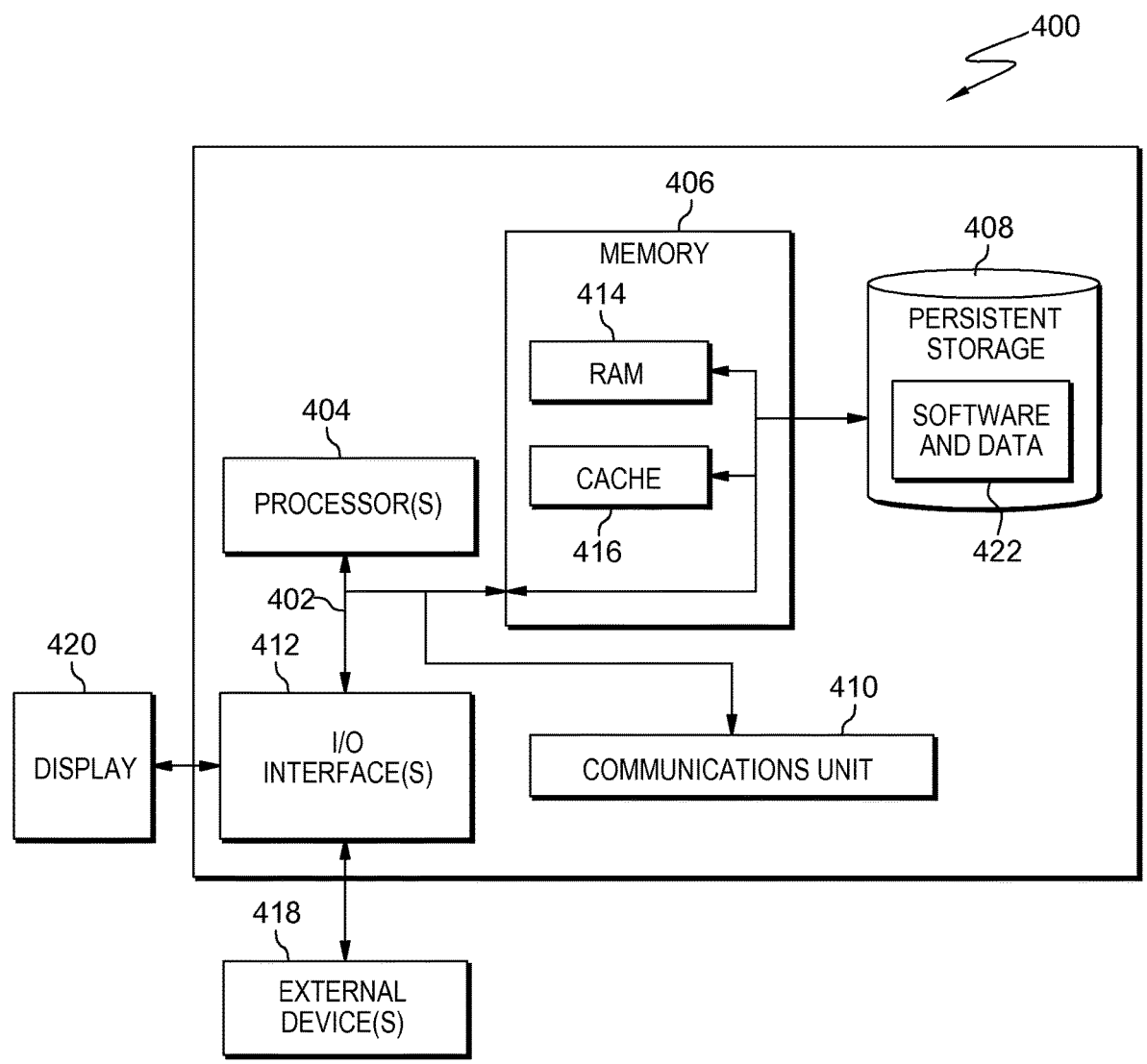
FIG. 4 depicts a block diagram of components of a computing device of FIG. 1, in accordance with an embodiment of the present invention.

FIG. 4 depicts a block diagram of components of computer 400, which is representative of computing device 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processor(s) 404 via one or more memories of memory 406. With respect to computing device 102, software and data 422 represents generator program 120 and DBMS 140.

In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data 422 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for generating data tables, the computer program product comprising:
   one or more computer readable storage media and program instructions stored on the one or more computer readable storage media, the program instructions comprising:
   program instructions to identify a first data table that includes a set of rows and a structure;
   program instructions to create a second data table having a matching structure as the first table and a third data table having the matching structure as the first table, wherein the second data table and the third data table comprise a closed system, and wherein the closed system enables data to be inserted, deleted and updated between the tables in the closed system;
   program instructions to distribute a subset of the set of rows of the first data table, wherein the subset of the set of rows is distributed between the second data table and the third data table based upon preset parameters, wherein a combination of rows distributed to the second table and rows distributed to the third table equals the total rows in the first table;
program instructions to, subsequent to the program instructions to distribute the set of rows of the first data table, generate one or more operations for the subset of the set of rows based on a statistical distribution function; and
program instructions to execute one of the one or more generated operations on the second data table and the third data table in the closed system.

2. The computer program product of claim 1, wherein creating a second data table and a third data table having the matching structure as the first table comprises program instructions to:
identify a schema for the first data table;
create a second data table with the matching schema as the first data table; and
create a third data table with the matching schema as the first data table.

3. The computer program product of claim 1, wherein generating one or more operations for the subset of the set of rows further comprises program instructions to:
generate an insert operation that includes inserting a row from the set of rows distributed to the second data table into the third data table and deleting the row from the subset of the set of rows distributed to the second data table.

4. The computer program product of claim 1, wherein generating one or more operations for the subset of the set of rows further comprises program instructions to:
generate a delete operation that includes deleting a row from the subset of the set of rows distributed to the third data table and inserting the row from the subset of the set of rows into the second data table.

5. The computer program product of claim 1, wherein generating one or more operations for the subset of the set of rows further comprises program instructions to:
generate an update operation that includes exchanging a row from the subset of the set of rows distributed to the second data table with a row from the subset of the set of rows distributed to the third data table.

6. The computer program product of claim 1, wherein distributing the subset of the set of rows of the first data table further comprises program instructions to:
distribute the subset of the set of rows of the first data table to the second data table;
identify a fourth data table that includes a set of rows; and
distribute the set of rows of the fourth data table to the second data table.

7. A computer system for generating data tables, the computer system comprising:
one or more computer processors;
one or more computer readable storage media;
program instructions stored on the computer readable storage media for execution by at least one of the one or more computer processors, the program instructions comprising:
program instructions to identify a first data table that includes a set of rows and a structure;
program instructions to create a second data table having a matching structure as the first table and a third data table having the matching structure as the first table, wherein the second data table and the third data table comprise a closed system, and wherein the closed system enables data to be inserted, deleted and updated between the tables in the closed system;
program instructions to distribute a subset of the set of rows of the first data table, wherein the subset of the set of rows is distributed between the second data table and the third data table based upon preset parameters, wherein a combination of rows distributed to the second table and rows distributed to the third table equals the total rows in the first table;
program instructions to, subsequent to the program instructions to distribute the set of rows of the first data table, generate one or more operations for the subset of the set of rows based on a statistical distribution function; and
program instructions to execute one of the one or more generated operations on the second data table and the third data table in the closed system.

8. The computer system of claim 7, wherein creating a second data table and a third data table having the matching structure as the first table comprises program instructions to:
identify a schema for the first data table;
create a second data table with the matching schema as the first data table; and
create a third data table with the matching schema as the first data table.

9. The computer system of claim 7, wherein generating one or more operations for the subset of the set of rows further comprises program instructions to:
generate an insert operation that includes inserting a row from the set of rows distributed to the second data table into the third data table and deleting the row from the subset of the set of rows distributed to the second data table.

10. The computer system of claim 7, wherein generating one or more operations for the subset of the set of rows further comprises program instructions to:
generate a delete operation that includes deleting a row from the subset of the set of rows distributed to the third data table and inserting the row from the subset of the set of rows into the second data table.

11. The computer system of claim 7, wherein generating one or more operations for the subset of the set of rows further comprises program instructions to:
generate an update operation that includes exchanging a row from the subset of the set of rows distributed to the second data table with a row from the subset of the set of rows distributed to the third data table.

12. The computer system of claim 7, wherein distributing the subset of the set of rows of the first data table further comprises program instructions to:
distribute the subset of the set of rows of the first data table to the second data table;
identify a fourth data table that includes a set of rows; and
distribute the set of rows of the fourth data table to the second data table.

* * * * *